(12) United States Patent
Akido

(10) Patent No.: US 6,644,140 B2
(45) Date of Patent: Nov. 11, 2003

(54) BALL SCREW

(75) Inventor: Haruo Akido, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 20 days.

(21) Appl. No.: 10/013,724

(22) Filed: Dec. 13, 2001

(65) Prior Publication Data

US 2002/0078775 A1 Jun. 27, 2002

(30) Foreign Application Priority Data

Dec. 26, 2000 (JP) ........................................ 2000-394403

(51) Int. Cl.⁷ .............................................. F16C 19/20
(52) U.S. Cl. ...................................... 74/424.88; 384/51
(58) Field of Search ...................... 74/424.88, 424.82; 384/43, 45, 521, 520, 51

(56) References Cited

U.S. PATENT DOCUMENTS

| | | | | |
|---|---|---|---|---|
| 4,175,805 A | * | 11/1979 | Becker et al. | 384/520 |
| 4,761,820 A | * | 8/1988 | Frank et al. | 384/520 |
| 6,095,009 A | * | 8/2000 | Takagi | 74/424.88 |
| 6,286,383 B1 | * | 9/2001 | Shirai et al. | 74/424.88 |
| 6,347,558 B1 | * | 2/2002 | Miyaguchi et al. | 384/43 |
| 6,415,676 B1 | * | 7/2002 | Takagi et al. | 74/424.88 |

FOREIGN PATENT DOCUMENTS

JP    2000-199556    7/2000

* cited by examiner

Primary Examiner—Thomas R. Hannon
Assistant Examiner—Bradley J. Van Pelt
(74) Attorney, Agent, or Firm—Armstrong, Westerman & Hattori, LLP

(57) ABSTRACT

A ball screw having spacers which can assuredly be retained between balls and prevent direct contact between the balls. The ball screw includes a plurality of spacers (1) provided between respective adjacent pairs of balls. The spacers (1) each include a base plate (2) having front and back surfaces, and at least three projections (4, 6) provided on each of the front and back surfaces of the base plate (2). The projections (4) on the front surface are offset from the projections (6) on the back surface. The spacers (1) are each provided perpendicularly to a traveling direction of the balls with the projections (4, 6) on the front and back surfaces resiliently abutting against the balls.

8 Claims, 4 Drawing Sheets

BALL SCREW

BACKGROUND OF THE INVENTION

1. Field of the Invention

The present invention relates to a ball screw for use in a feed mechanism of a machine tool and, more particularly, to a ball screw having spacers interposed between respective adjacent pairs of balls.

2. Description of the Prior Art

Ball screws of the aforesaid type for use in a feed mechanism generally have a construction as shown in FIG. 6. As shown, the ball screw 100 includes a screw shaft 101 having a helical ball rolling groove 102 formed in an outer peripheral surface thereof, a ball nut 103 having a helical ball rolling groove 105 formed in an inner peripheral surface thereof in an opposed relation with the ball rolling groove 102 and ball circulation channels 106, 108, 110 provided therein to connect opposite ends of the ball rolling groove 105, and a plurality of balls 111 provided in a channel defined between the ball rolling grooves 102 and 105 and the ball circulation channels 106, 108, 110. The ball nut 103 includes a cylindrical nut body 104 and end caps 107, 109 provided at opposite ends of the nut body 104. The nut body 104 is formed with the ball rolling groove 105 and the ball circulation channel 106. The end caps 107 and 109 are formed with the ball circulation channels 108 and 110, respectively.

The ball screw 100 shown in FIG. 6 is of a so-called end cap type. Other exemplary types include a return tube type and a guide plate type, depending on the arrangement of the ball circulation channels.

In the ball screw 100 having the aforesaid construction, however, the balls 111 have slight variations in revolving speed during the rolling movement thereof due to variations in the profile of the ball rolling grooves 102, 105. If an upstream ball 111 revolves at a higher revolving speed than a downstream ball 111 with respect to a traveling direction of the balls 111, the upstream and downstream balls 111 collide and push against each other, so that a compression force is exerted on a contact between the balls 111 pushing against each other. The compression force acting on the contact between the balls 111 causes the balls 111 sliding contact in a direction such as to prevent the rolling of the balls 111. This develops a great resistance to prevent the rolling of the balls 111, thereby varying or significantly increasing the dynamic torque of the ball screw 100. Further, clogging with the balls 111 may occur.

To solve the aforesaid problem, a ball screw has been proposed in which spacers are interposed between respective adjacent pairs of balls 111. Examples of the spacers are shown in FIGS. 7 and 8.

A spacer 120 shown in FIG. 7 is a hollow cylindrical member having opposite end faces 121, 121 of a concave spherical shape. The spacer 120 is interposed between each adjacent pair of balls 111, 111 with the opposite end faces 121, 121 in contact with the balls 111 to prevent direct contact between the balls 111, 111. The concave spherical end faces 121, 121 of the spacer 120 entirely contact the balls 111, 111, so that a great contact resistance is developed during the rolling of the balls 111. Therefore, dynamic torques of the balls 111 are increased, resulting in clogging with the balls.

A spacer 130 shown in FIG. 8 has opposite end faces 131, 131 of a generally concave spherical shape, which are each entirely formed with a plurality of projections 132. With this arrangement, areas of contact between balls 111 and the end faces 131 are reduced, so that a contact resistance occurring therebetween is reduced to solve the aforesaid problem.

However, the spacer 120 of FIG. 7 and the spacer 130 of FIG. 8 suffer from the following problems. There are dimensional variations such as variations in the effective diameter of the channel defined between the ball rolling grooves 102 and 105, the diameter of the balls 110 and the total length of the ball circulation channels 106, 108, 110 due to machining errors. Even if the balls 111 and the spacers 120 (130) are tightly inserted in an alternating relation in the channel defined between the ball rolling grooves 102 and 105 and the ball circulation channels 106, 108, 110, a gap inevitably occurs between an initially inserted ball 111 and a finally inserted spacer 120 (130) due to the dimensional variations. Therefore, when the screw shaft 101 (or ball nut 103) is rotated, the dynamic torque of the ball screw 100 is varied or significantly increased, or the spacers 120 (130) are inclined, thereby preventing the circulation of the balls 111.

One conceivable approach to this problem is to prepare several types of spacers 120 (130) having different lengths and select a spacer 120 (130) having a length appropriate for filling the gap when it is finally inserted in the channel. However, the production, maintenance and assembly of such spacers are troublesome with little practical advantage.

In view of the foregoing, it is an object of the present invention to provide a ball screw having spacers which can assuredly be retained between balls and prevent direct contact between the balls.

SUMMARY OF THE INVENTION

In accordance with the present invention to achieve the aforesaid object, there is provided a ball screw which comprises: a screw shaft having a helical ball rolling groove formed in an outer peripheral surface thereof; a ball nut having a helical ball rolling groove formed in an inner peripheral surface thereof in an opposed relation with the ball rolling groove of the screw shaft, and a ball circulation channel provided therein to connect opposite ends of the ball rolling groove thereof; a plurality of balls provided in a channel defined between the ball rolling grooves and the ball circulation channel; and a plurality of spacers interposed between respective adjacent pairs of balls; wherein the spacers each comprise a base plate having front and back surfaces, and at least three projections provided on each of the front and back surfaces of the base plate, the projections on the front surface being offset from the projections on the back surface; wherein the spacers are each provided perpendicularly to a traveling direction of the balls with the projections on the front and back surfaces resiliently abutting against the balls adjacent thereto.

In the ball screw according to the present invention, the spacers each have the base plate and the at least three projections provided on each of the front and back surfaces of the base plate, and the projections on the front surface are offset from the projections on the back surface. The spacers are provided perpendicularly to the traveling direction of the balls between the balls. When an action force is exerted on an adjacent pair of balls to urge the balls toward each other, the projections on the front and back surfaces of a spacer provided between the balls abut against the balls, and receive reaction forces from the balls. At this time, the reaction forces act on different points on the front and back surfaces of the base plate, because the projections on the front surface are offset from the projections on the back surface. The base plate is planar and, hence, is more liable to be resiliently deformed than the cylindrical member of the conventional spacer. In addition, the reaction forces act on the different points on the front and back surfaces. Therefore, the spacer can easily absorb the reaction forces by the resilient deformation thereof to permit reduction of a spacing between the balls.

Thus, the spacers according to the present invention per se are resiliently deformed to adjust the spacing between the balls. Even if there is a gap between an initially inserted ball and a finally inserted spacer under no load due to dimensional variations such as variations in the effective diameter of the channel defined between the ball rolling grooves, the diameter of the balls and the length of the ball circulation channel which may occur due to machining errors, the gap can be filled by insertion of one more ball by resiliently deforming the spacers under a load applied to the spacers. The resilient deformation of the spacers provided between the balls makes it possible to firmly retain the spacers between the balls with no gap between the balls and the spacers.

The aforesaid function of the spacers makes it possible to prevent the problems associated with the prior art, i.e., the variation or significant increase of the dynamic torque of the ball screw or the ball circulation failure due to the inclination of the spacers, which may otherwise occur due to gaps between the balls and the spacers.

Since the balls abut against the projections of the spacer, spaces are defined between the base plate of the spacer and the balls. Therefore, a grease can be retained in the spaces for improved lubrication.

Preferably, the projections are equidistantly arranged circularly around the center of the spacer on each of the front and back surfaces. This makes it possible to evenly resiliently deform the spacer to retain the spacer between the balls with an increased retention force.

The spacers may each comprise a plate member which has front and back surfaces, and includes at least three projections and at least three indentations provided circularly around the center thereof in an alternating relation on each of the front and back surfaces, wherein the projections and the indentations on the front surface respectively positionally correspond to the indentations and the projections on the back surface. The spacers are each provided perpendicularly to the traveling direction of the balls between the balls with the projections on the front and back surfaces resiliently abutting against the balls adjacent thereto.

With this arrangement, when an action force is exerted on an adjacent pair of balls to urge the balls toward each other, the projections on the front and back surfaces of a spacer provided between the balls abut against the balls, and receive reaction forces from the balls. At this time, the reaction forces act on different points on the front and back surfaces of the spacer, because the projections and the indentations on the front surface of the spacer respectively positionally correspond to the indentations and the projections on the back surface. The spacer is of a plate shape and, hence, is more liable to be resiliently deformed than the cylindrical member of the conventional spacer. In addition, the reaction forces act on the different points on the front and back surfaces of the spacer. Therefore, the spacer can easily absorb the reaction forces by the resilient deformation thereof to permit reduction of a spacing between the adjacent pair of balls.

Thus, the spacers per se are resiliently deformed to adjust the spacing between the balls. Even if there is a gap between an initially inserted ball and a finally inserted spacer under no load due to dimensional variations such as variations in the effective diameter of the channel defined between the ball rolling grooves, the diameter of the balls and the length of the ball circulation channel which may occur due to machining errors, the gap can be filled by insertion of one more balls by resiliently deforming the spacers under a load applied to the spacers. The resilient deformation of the spacers provided between the balls makes it possible to firmly retain the spacers between the balls with no gap between the balls and the spacers.

The aforesaid function of the spacers makes it possible to prevent the problems associated with the prior art, i.e., the variation or significant increase of the dynamic torque of the ball screw or the ball circulation failure due to the inclination of the spacers, which may otherwise occur due to gaps between the balls and the spacers.

Since the balls abut against the projections of the spacer, spaces are defined between the indentations of the spacer and the balls. Therefore, a grease can be retained in the spaces for improved lubrication.

DESCRIPTION OF THE PREFERRED EMBODIMENTS

Figure 1:
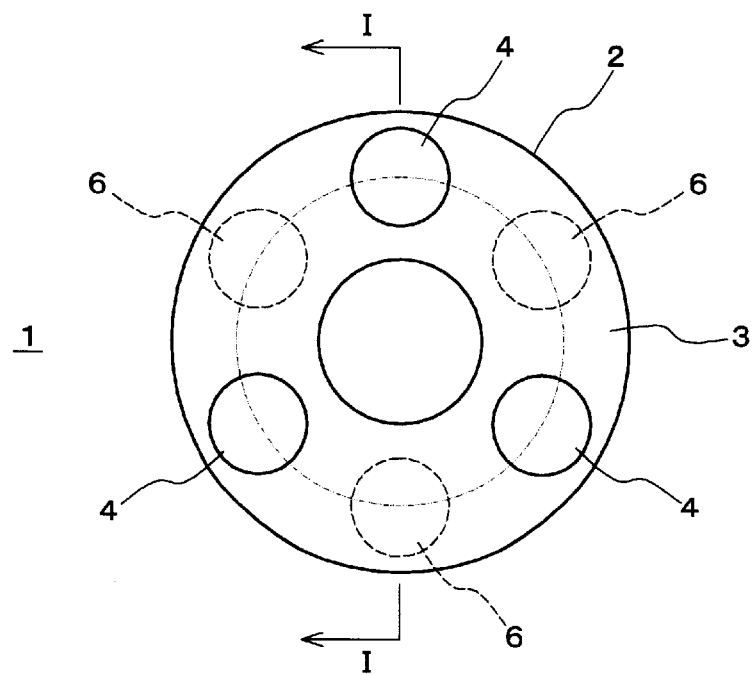
FIG. 1 is a front view illustrating a spacer according to one embodiment of the present invention.
Figure 2:
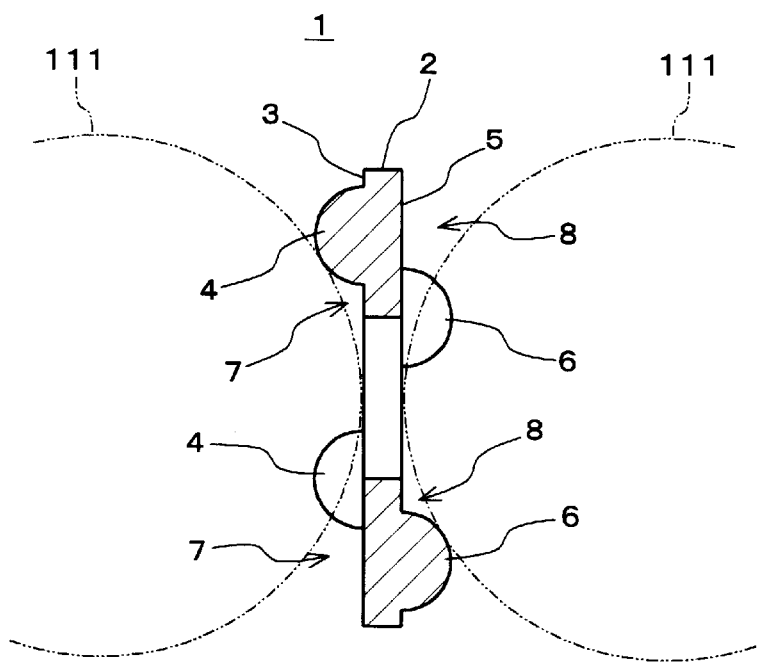
FIG. 2 is a sectional view of the spacer as seen in an arrow direction I—I in FIG. 1.
Figure 3:
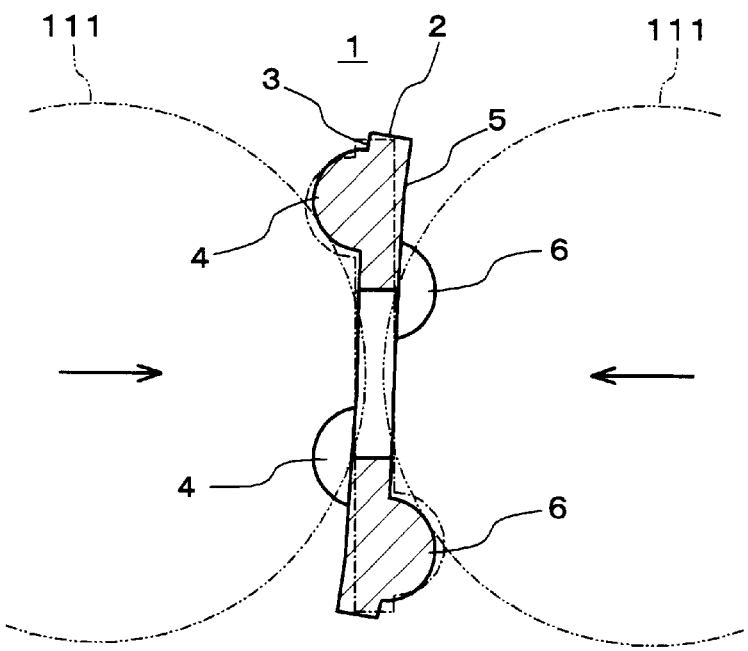
FIG. 3 is a sectional view for explaining the function of the spacer according to the embodiment.
Figure 6:
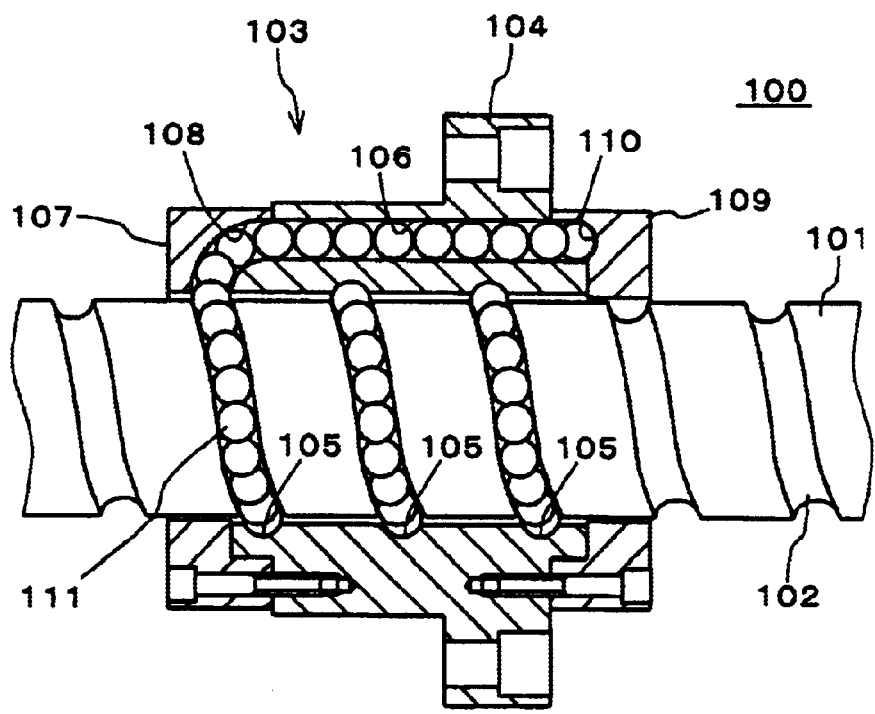
FIG. 6 is a sectional view illustrating the construction of a conventional ball screw.
Figure 7:
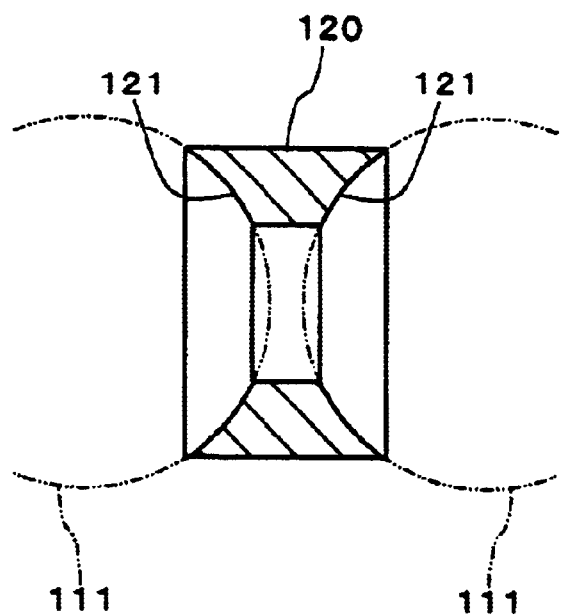
FIG. 7 is a sectional view of a spacer according to the prior art.
Figure 8:
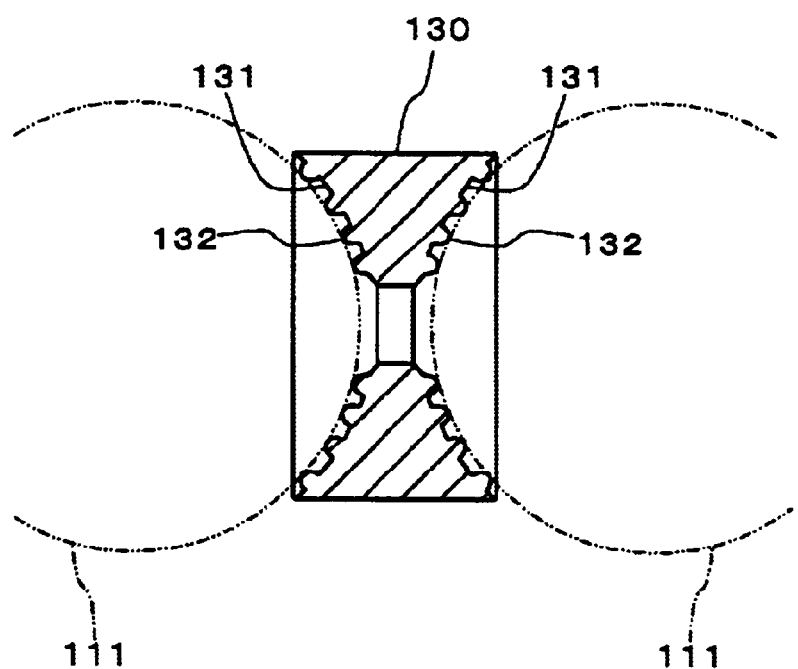
FIG. 8 is a sectional view of another spacer according to the prior art.

With reference to the attached drawings, the present invention will hereinafter be described by way of specific embodiments thereof. FIG. 1 is a front view illustrating a spacer according to one embodiment of the present invention, and FIG. 2 is a sectional view of the spacer as seen in an arrow direction I—I in FIG. 1. The ball screw according to this embodiment has substantially the same basic construction as the ball screw 100 shown in FIG. 6, except that spacers each having a construction as shown in FIGS. 1 to 3 are interposed between respective adjacent pairs of balls 111. Therefore, a reference is made to FIG. 6 for the basic construction of the ball screw according to this embodiment, and no detailed explanation will be given thereto. In the following explanation, like components are denoted by like reference characters.

As shown in FIGS. 1 and 2, the spacer 1 according to this embodiment has a planar annular base plate 2, three projections 4 provided on a front surface 3 of the base plate 2, and three projections 6 provided on a back surface 5 of the base plate 2. The projections 4 and 6 are of a semi-spherical shape, and equidistantly arranged circularly around the center of the spacer on the front and back surfaces 3 and 5, respectively. The projections 4 on the front surface 3 are angularly offset by 60 degrees from the projections 6 on the back surface 5.

As shown in FIG. 2, the spacer 1 is provided perpendicularly to a traveling direction of the balls 111 between each adjacent pair of balls 111 and 111 with the projections 4, 6 abutting against the balls 111, 111. As a result, spaces 7, 8 which serve as grease retaining spaces are defined between the base plate 2 and the balls 111.

With the spacer 1 thus provided between the adjacent pair of balls 111 and 111, when an action force is exerted on the adjacent balls 111, 111 in an arrow direction to urge the balls toward each other as shown in FIG. 3, the projections 4, 6 provided on the front and back surfaces 3, 5 abut against the balls 111, 111, and receive reaction forces from the balls 111, 111. At this time, the reaction forces act on different points on the front and back surfaces 3, 5 of the base plate 2, because the projections 4 on the front surface 3 are offset from the projections 6 on the back surface 5. The base plate 2 is planar and, hence, is more liable to be resiliently deformed than the cylindrical member of the conventional spacer. In addition, the reaction forces act on the different points on the front and back surfaces 3, 5. Therefore, the spacer 1 can easily absorb the reaction forces by the resilient deformation thereof to permit reduction of a spacing between the balls 111 and 111. In FIG. 3, a state where no load acts on the spacer 1 is indicated by a chain line, and a state where a spacer 1 is resiliently deformed under a load is indicated by a continuous line.

Thus, the spacers 1 according to this embodiment per se are resiliently deformed to adjust the spacing between the balls 111. Even if there is a gap between an initially inserted ball 111 and a finally inserted spacer 1 under no load due to dimensional variations such as variations in the effective diameter of a channel defined between ball rolling grooves 102, 105, the diameter of the balls 111 and the total length of ball circulation channels 106, 108, 110 which may occur due to machining errors, the gap can be filled by insertion of one more balls 111 by resiliently deforming the spacers 1 under a load applied to the spacers 1. The resilient deformation of the spacers 1 provided between the balls 111 makes it possible to firmly retain the spacers 1 between the balls 111 with no gap between the balls 111 and the spacers 1.

The aforesaid function of the spacers 1 makes it possible to prevent the problems associated with the prior art, i.e., the variation or significant increase of the dynamic torque of the ball screw or the ball circulation failure due to the inclination of the spacers, which may otherwise occur due to gaps between the balls 111 and the spacers.

Further, the grease retaining spaces 7, 8 which each have a greater volume are defined between the base plate 2 of the spacer 1 and the balls 111 for improved lubrication.

The spacers 1 according to this embodiment can be produced by injection molding of a synthetic resin or sheet metal press working.

In this embodiment, the numbers of the projections 4 and 6 are three, but are not to be limited thereto. The projections 4, 6 may each be provided in any number not smaller than three. The shape of the projections is not limited to the semi-spherical shape. However, it is important to provide the projections 4 and 6 in an offset relation on the front and back surfaces of the spacer, respectively.

Figure 4:
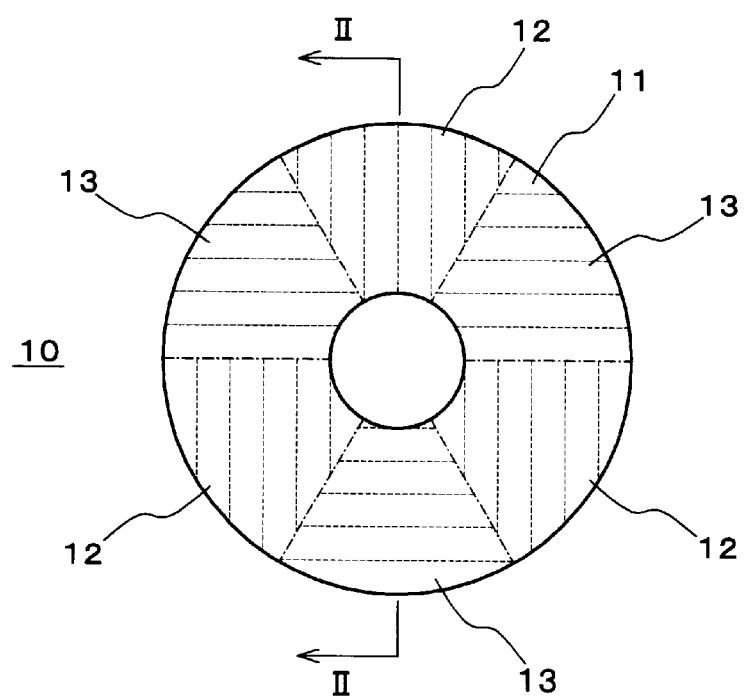
FIG. 4 is a front view illustrating a spacer according to another embodiment of the present invention.
Figure 5:
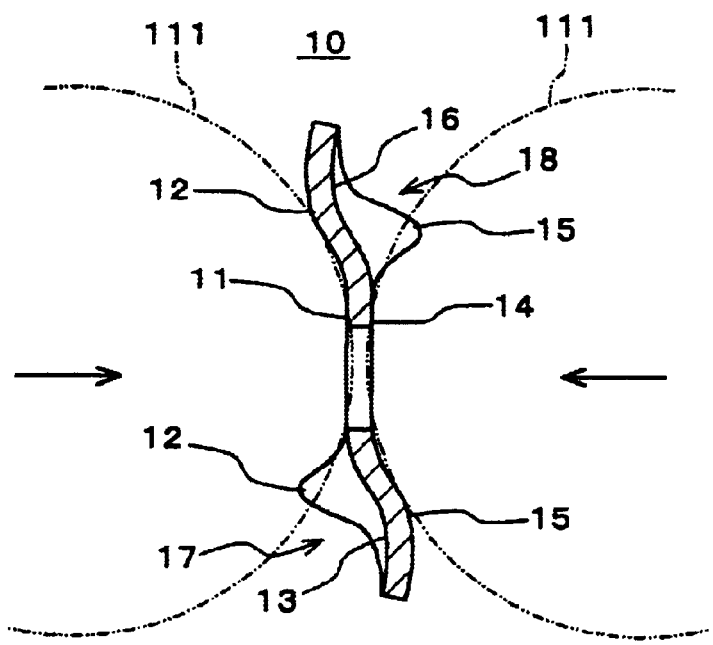
FIG. 5 is a sectional view of the spacer as seen in an arrow direction II—II in FIG. 4.

Alternatively, spacers each having a construction as shown in FIGS. 4 and 5 may be employed. FIG. 4 is a front view of the spacer. FIG. 5 is a sectional view of the spacer as seen in an arrow direction II—II in FIG. 4.

As shown in FIGS. 4 and 5, the spacer 10 is an annular plate member having three projections 12 and three indentations 13 provided circularly around the center thereof in an alternating relation on a front surface 11 thereof and three projections 15 and three indentations 16 provided circularly around the center thereof in an alternating relation on a back surface 14 thereof. The projections 12 and the indentations 13 on the front surface 11 respectively positionally correspond to the indentations 16 and the projections 15 on the back surface 14. For example, the front surface 11 shown in FIG. 4 has six equiangularly sectored regions, in which the projections 12 and the indentations 13 are alternately defined. The projections 12 each have a greatest height at the center of a corresponding sectored region, while the indentations 13 each have a greatest depth at the center of a corresponding sectored region.

As shown in FIG. 5, the spacer 10 is provided perpendicularly to the traveling direction of the balls 111 between each adjacent pair of balls 111 and 111 with the projections 12 and 15 on the front and back surfaces 11 and 14 abutting against the balls 111, 111. As a result, spaces 17, 18 which serve as grease retaining spaces are defined between the spacer 10 and the balls 111.

With the spacer 10 thus provided between the adjacent pair of balls 111 and 111, when an action force is exerted on the adjacent balls 111, 111 in an arrow direction to urge the balls toward each other, the projections 12, 15 provided on the front and back surfaces 11, 14 abut against the balls 111, 111, and receive reaction forces from the balls 111, 111. At this time, the reaction forces act on different points on the front and back surfaces 11, 14 of the spacer 10, because the projections 12 and the indentations 13 on the front surface 11 respectively positionally correspond to the indentations 16 and the projections 15 on the back surface 14. The spacer 10 is of a plate shape and, hence, is more liable to be resiliently deformed than the cylindrical member of the conventional spacer. In addition, the reaction forces act on the different points on the front and back surfaces 11, 14. Therefore, the spacer 10 can easily absorb the reaction forces by the resilient deformation thereof to permit reduction of a spacing between the balls 111.

Thus, the spacers 10 according to this embodiment per se are resiliently deformed to adjust the spacing between the balls 111 as the spacers 1. Even if there is a gap between an initially inserted ball 111 and a finally inserted spacer 10 under no load due to dimensional variations such as variations in the effective diameter of the channel defined between the ball rolling grooves 102, 105, the diameter of the balls 111 and the total length of the ball circulation channels 106, 108, 110 which may occur due to machining errors, the gap can be filled by insertion of one more ball by resiliently deforming the spacers 10 under a load applied to the spacers 10. The resilient deformation of the spacers 10 provided between the balls 111 makes it possible to firmly retain the spacers 10 between the balls 111 with no gap between the balls 111 and the spacers 10.

The aforesaid function of the spacers makes it possible to prevent the problems associated with the prior art, i.e., the variation or significant increase of the dynamic torque of the ball screw or the ball circulation failure due to the inclination of the spacers, which may otherwise occur due to gaps between the balls 111 and the spacers.

The grease retaining spaces 17, 18 which each have a greater volume are defined between the spacer 10 and the balls 111 for improved lubrication.

The spacers 10 according to this embodiment can be produced by injection molding of a synthetic resin or sheet metal press working.

In this embodiment, the numbers of the projections 12, 15 and the indentations 13, 16 provided on the front and back surfaces 11, 14 are three, but not limited thereto. The projections 12, 15 and the indentations 13, 16 may be provided in any numbers not smaller than three.

What is claimed is:

1. A ball screw comprising:

a screw shaft having a helical ball rolling groove formed in an outer peripheral surface thereof;

a ball nut having a helical ball rolling groove formed in an inner peripheral surface thereof in an opposed relation with the ball rolling groove of the screw shaft, and a ball circulation channel provided therein to connect opposite ends of the ball rolling groove thereof;

a plurality of balls provided in a channel defined between the ball rolling grooves and in the ball circulation channel; and a plurality of spacers provided between respective adjacent pairs of balls;

wherein the spacers each comprise a base plate having front and back surfaces and at least three mutually spaced projections provided on each of the front and back surfaces of the base plate and projecting outwardly therefrom, the projections on the front surface being angularly offset from the projections on the back surface;

wherein the spacers are each provided perpendicularly to a traveling direction of the balls with the projections on the front and back surfaces resiliently abutting against the balls adjacent thereto.

2. A ball screw as set forth in claim 1, wherein the projections are equidistantly arranged circularly around the center of the spacer on each of the front and back surfaces.

3. A ball screw as set forth in claim 1, wherein the spacer has a through-hole extending through a center portion thereof.

4. A ball screw as set forth in claim 1, wherein grease retaining spaces are defined between the projections on each of the front and back surfaces.

5. A ball screw comprising:

a screw shaft having a helical ball rolling groove formed in an outer peripheral surface thereof;

a ball nut having a helical ball rolling groove formed in an inner peripheral surface thereof in an opposed relation with the ball rolling groove of the screw shaft and a ball circulation channel provided therein to connect opposite ends of the ball rolling groove thereof;

a plurality of balls provided in a channel defined between the ball rolling grooves and in the ball circulation channel; and a plurality of spacers provided between respective adjacent pairs of balls;

wherein the spacers each comprise a base plate having front and back surfaces, and at least three mutually spaced projections provided on each of the front and back surfaces of the base plate and projecting outwardly therefrom, the projections on the front surface being angularly offset from the projections on the back surface;

wherein the spacers are each provided perpendicularly to a traveling direction of the balls with the projections on the front and back surfaces resiliently abutting against the balls adjacent thereto, wherein each spacer comprises a plate member having front and back surfaces and said at least three projections and at least three indentations provided thereon are provided circularly around the center thereof in an alternating relation on each of the front and back surfaces, and the projections and the indentations on the front surface respectively positionally correspond to the indentations and the projections on the back surface, and wherein the spacers are each provided perpendicularly to the traveling direction of the balls with the projections on the front and back surfaces resiliently abutting against the balls adjacent thereto.

6. A ball screw as set forth in claim 5, wherein the projections and indentations are equidistantly arranged circularly around the center of the spacer on each of the front and back surfaces.

7. A ball screw as set forth in claim 5, wherein the spacers each have a through-hole extending through a center portion thereof.

8. A ball screw as set forth in claim 5, wherein the indentations on each of the front and back surfaces are defined as grease retaining spaces.

* * * * *